United States Patent [19]
Li et al.

[11] Patent Number: 5,911,138
[45] Date of Patent: Jun. 8, 1999

[54] DATABASE SEARCH FACILITY HAVING IMPROVED USER INTERFACE

[75] Inventors: Shih-Gong Li; Bruce Allan Tate, both of Austin, Tex.

[73] Assignee: International Business Machines Corporation, Armonk, N.Y.

[21] Appl. No.: 08/072,626

[22] Filed: Jun. 4, 1993

[51] Int. Cl.$^6$ .................................................. G06F 17/30
[52] U.S. Cl. ............................ 707/3; 707/100; 345/339; 345/348; 345/352
[58] Field of Search ................................... 395/600, 157, 395/159, 160; 364/401, 403, 408; 707/1–4, 100–102; 345/339, 348, 352

[56] References Cited

U.S. PATENT DOCUMENTS

| | | | |
|---|---|---|---|
| 4,399,504 | 8/1983 | Obermarck et al. | 364/200 |
| 4,400,773 | 8/1983 | Brown et al. | 364/200 |
| 4,480,304 | 10/1984 | Carr et al. | 364/200 |
| 4,769,772 | 9/1988 | Dwyer | 364/300 |
| 4,847,754 | 7/1989 | Obermarck et al. | 364/200 |
| 4,875,159 | 10/1989 | Cary et al. | 364/200 |
| 4,965,719 | 10/1990 | Shoens et al. | 364/200 |
| 5,041,967 | 8/1991 | Ephrath et al. | 364/200 |
| 5,050,072 | 9/1991 | Earnshaw et al. | 364/200 |
| 5,062,038 | 10/1991 | Jordan, Jr. | 364/200 |
| 5,091,852 | 2/1992 | Tsuchida et al. | 395/600 |
| 5,101,488 | 3/1992 | Rosenthal et al. | 395/425 |
| 5,161,225 | 11/1992 | Abraham et al. | 395/600 |
| 5,265,014 | 11/1993 | Haddock et al. | 364/419.08 |
| 5,426,781 | 6/1995 | Kaplan et al. | 395/600 |
| 5,428,735 | 6/1995 | Kahl et al. | 395/159 |
| 5,428,776 | 6/1995 | Rothfield | 395/600 |
| 5,495,605 | 2/1996 | Cadot | 395/600 |

FOREIGN PATENT DOCUMENTS

| | | | |
|---|---|---|---|
| 0541298-A2 | 5/1993 | European Pat. Off. | G06F 15/403 |
| 0541298-A3 | 5/1993 | European Pat. Off. | G06F 15/403 |
| WO 9106916 | 5/1991 | WIPO | G06F 15/40 |
| 9112580 | 8/1991 | WIPO | G06F 15/400 |

OTHER PUBLICATIONS

Burns et al., "A Graphical Entity–Relationship Database Browser," Proceedings of the Twenty–First Annual Hawaii International Conference on System Sciences, vol. II, pp. 694–704, 1988.

Ex Parte Beauregard, unpublished Board Patent Appeals & Interferences Decision.

"Visual Query Specification in a MUltimedia Database System" by Daniel Keim and Vincent Lum, Visualization, 1992 Conference, IEEE, Sep. 1992.

IBM Technical Disclosure Bulletin, vol. 32 No. 6B Nov. 1989. Data Exchange by Cut and Paste with Dimensional Mapping.

IBM Technical Disclosure Bulletin, vol. 32, No. 8A Jan. 1990. Method for 3–Dimensional Scrolling.

IBM Technical Disclosure Bulletin, vol. 33 No. 3A Aug. 1990. Terminal for Real–Time Viewing of Multidimensional Data.

(List continued on next page.)

*Primary Examiner*—Thomas G. Black
*Assistant Examiner*—Hosain T. Alam
*Attorney, Agent, or Firm*—Jeffrey S. LaBaw; David H. Judson

[57] ABSTRACT

A search facility having a user interface including three windows: a query window, a graph window and a history window. Each of the windows is presented simultaneously in the graphical user interface. The query window displays the text of the most recently input query statement which is searched in a database stored in a computer system. The graph window graphically displays the current results of the most recent query statement. The history window presents the query statements and their results during the current query session. In one preferred embodiment, the query statements and their results are graphically presented as a tree, wherein the query statements and query results are nodes and each query statement result is a child of the query statement which was run to create it. Input to any of the windows will change the presentation of data within the other two windows.

21 Claims, 10 Drawing Sheets

OTHER PUBLICATIONS

IBM Technical Disclosure Bulletin, vol. 34 No. Feb. 9, 1992. Interactive Variable Control During Visualization of Mathematical Functions.

IBM Technical Disclosure Bulletin, vol. 35 No. Nov. 6, 1992. Many–Dimensional Visualization Technique.

IBM Technical Disclosure Bulletin, vol. 33 No. Feb. 9, 1991. Visual Representation of Database Query Definition.

The Computer Jornal. vol. 33. No. 1, 1990, pp. 31–39. BRMQ: A Database Interface Facility Based on Graph Traversals and Extended Relationships on Groups of Entities.

Graphical Query Languages for Semantic Database Models, Bogdan Czejdo, Ramez Elmasri, and Marek Rusinkiewicz and David W. Embley, pp. 615–619, 621–623, no date.

The Computer Jornal (1988) June, vol. 31, No. 3, Cambridge, Gr. Britain. From Entity–relationship Diagrams to Fourth Normal Form: A Pictorial Aid to Analysis. Kathryn S. Dawson and Lorraine M. Purgailis Parker.

Engineering Computers, (1988), pp. 239–249. User Interfaces for Structural Engineering Relational Data Base, H. Craig Howard and Cynthia Stotts Howard.

DATABASE SEARCH FACILITY HAVING IMPROVED USER INTERFACE

BACKGROUND OF THE INVENTION

This invention relates generally to computer stored databases. More particularly, it relates to a system, program and method for accessing a database utilizing a graphical user interface.

Computer stored databases have attracted an increasing amount of interest, not only because of the rapid expansion in the data stored and retrieved by these databases, but also as a result of the data relationships which can be established during the storage or retrieval processes. With the growing prevalence of relational databases, the training and experience of a typical end user has decreased as the available resources have increased. Users of databases have been particularly desirous of improvements in the graphical user interfaces to control the database applications to make them understandable by the novice user.

One of the more difficult elements of problem solving when using a database is often the identification of the sources that cause a particular problem. Search statements or queries are usually used for searching information stored in a database in an organized fashion to help problem solving. When users have few clear ideas about how to construct the proper query for solving a problem, a common approach is to start by examining an initial query report resulting from an initial query for more information. Based on this information, the user then decides how to narrow the search, or "drill down" further within the database. If these narrowed searches do not produce the desired result, then the user must back up to a previous search statement and try again.

Current search techniques are cumbersome, inhibiting efficient query formulation. Most existing systems do not provide a query history. These systems make iterative problem solving difficult by forcing the user to 1) remember all previous results, or 2) manually save or print the query and result. This is cumbersome.

Those systems that do provide a history usually provide some sort of linear log. Many commercially available databases have a history command which allows the user to access this log. The information within the log is usually not adequate. It may contain the number of "hits" which satisfy a search particular set of statements. It may contain nothing more than the initial query. The problem with these approaches are two fold. First, the log is presented in a linear way. This linear presentation does not reflect the actual problem solving process, where one query may be refined to produce another. Second, there is no convenient way to access the log. Further, when invoked, the history command removes both the detailed query statement and the detailed results of the last query statement from the display. The user must recall these details in the context of the limited summary when altering his search strategy. Also, the only method in most search systems to change a search is to write additional query statements.

SUMMARY OF THE INVENTION

The present invention represents an improvement over prior art database search systems.

It is therefore an object of the invention to present a query statement and a graphical representation of its result when searched in a database simultaneously in a graphical user interface.

It is another object of the invention to change the set of query statements by manipulating the graphical presentation of the query result.

It is another object of the invention to graphically represent the relationship of the query statements and query results in a graphical user interface.

These and other objects are accomplished by a search facility having a user interface including three windows: a query window, a graph window and a history window. Each of the windows is presented concurrently in the graphical user interface. The query window displays the text of the most recently input query statement which is searched in a database stored in a computer system. The graph window graphically displays the current results of the most recent query statement. The history window presents the query statements and their results during the current query session. In one preferred embodiment, the query statements and their results are graphically presented as a tree, wherein the query statements and query results are nodes and each query statement result is a child of the query statement which was searched to create it.

Input to any of the windows will change the presentation of data within the other two windows. Additional query statements will change the graphical presentation of the results in the graph window and add new nodes to the tree presented in the history window. By manipulating the graphical presentation of the results in the graph window, new or modified query statements are generated and presented in the query window, which also add nodes to the history window. By selecting particular nodes in the tree in the history window, the user can return to and modify previous queries to construct new query statements. By selecting the root node in the history window, the user can initiate a new query statement independent of any previous query statement. The new or modified query statements are searched so that the query results are provided in the graph window and new nodes are created in the history window.

BRIEF DESCRIPTION OF THE DRAWINGS

These and other features, advantages and objects will be more easily understood with reference to the following description and attached drawings.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal* Systems/2 Model 50, 60 systems IBM Corporation, Part No. 68X2224 Order Number S68X-2224 and *Technical Reference Manual Personal Systems/2* (Model 80) IBM Corporation Part No. 68X 2256 Order Number S68X-2254. One operating system which an IBM PS/2 personal computer may run is IBM's OS/2 2.0 (TM). For more information on the IBM OS/2 2.0 Operating System, the reader is referred to OS/2 2.0 *Technical Library, Programming Guide Vol.* 1, 2, 3 *Version* 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 are described in many publications of the IBM Corporation, for example, *RISC System/6000, 7073 and 7016 POWERstation and POWERserver Hardware Technical* reference, Order No. SA23-2644-00. The AIX operating system is described in *General Conceipts and Procedure—AIX Version 3 for RISC System/6000* Order No. SC23-2202—00 as well as other publications of the IBM Corporation.

Figure 1:
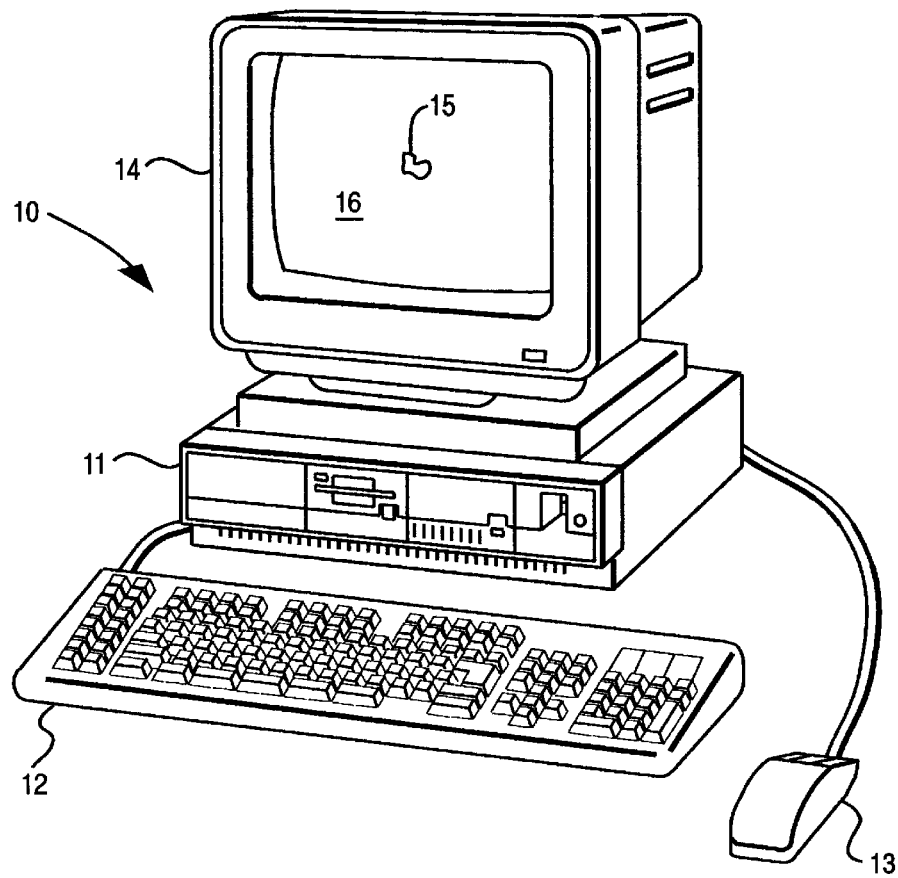
FIG. 1 depicts a computer system including system display, system unit, mouse and keyboard.

In FIG. 1, a computer 10, comprising a system unit 11, a keyboard 12, a mouse 13 and a display 14 are depicted. The screen 16 of display device 14 is used to present the graphical user interface (GUI). The graphical user interface supported by the operating system allows the user to use a point and shoot method of input, i.e., by moving the mouse pointer 15 to an icon representing a data object at a particular location on the screen 16 and pressing one of the mouse buttons to perform a user command or selection.

Figure 2:
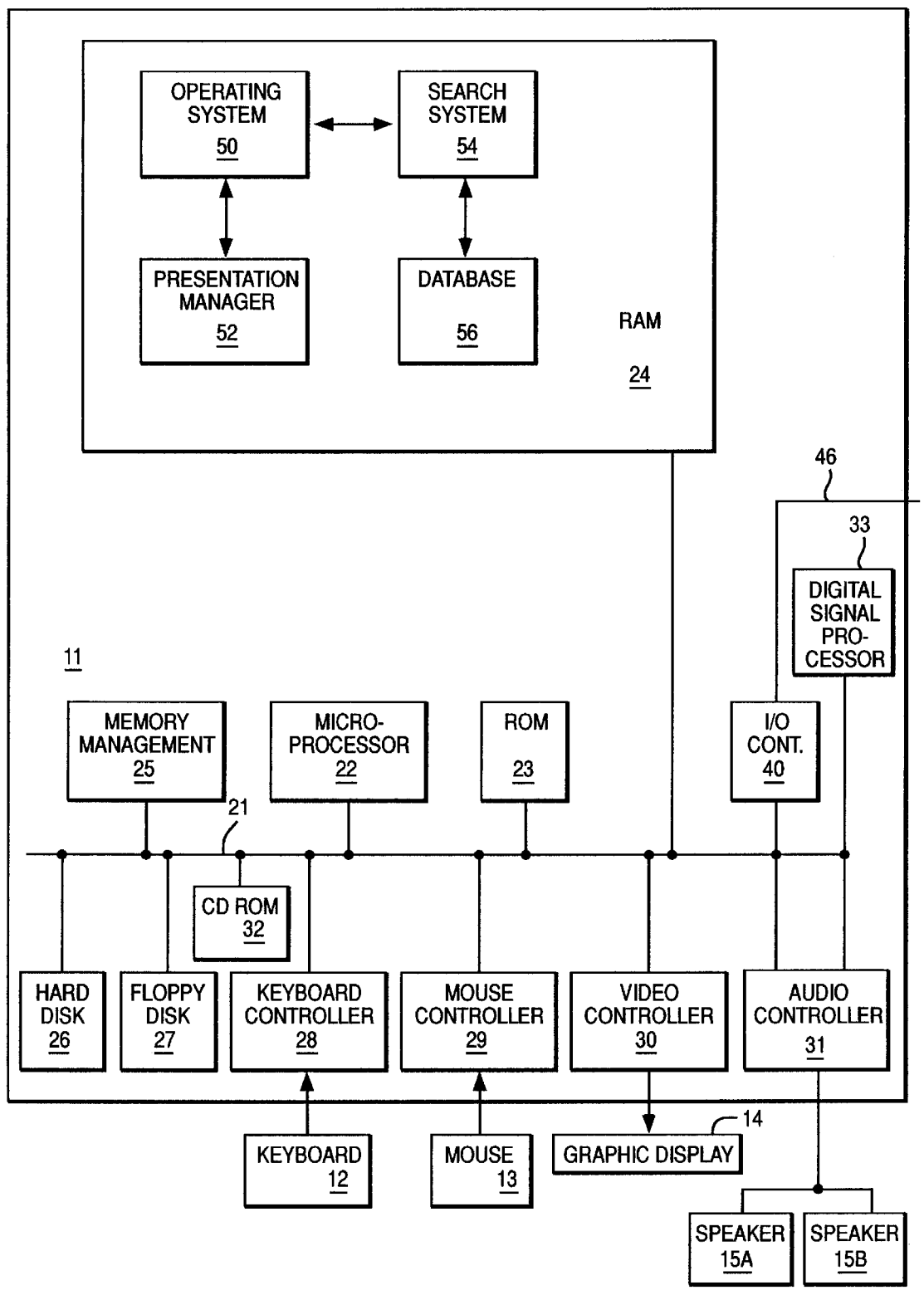
FIG. 2 is an architectural block diagram of the computer system in FIG. 1.

FIG. 2 shows a block diagram of the components of the personal computer shown in FIG. 1. The system unit 11 includes a system bus or plurality of system buses 21 to which various components are coupled and by which communication between the various components is accomplished, The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32, also coupled to the system bus 21, is used to store a large amount of data, e.g., a multimedia program or large database.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory 24. Until required by the computer system, the set of instructions may be stored in another computer memory, for example, in the hard disk drive 26, in an optical disk for eventual use in the CD ROM 32 or in a floppy disk for eventual use in the floppy disk drive 27. As shown in the figure, the operating system 50 and presentation manager 52 are resident in RAM 24. In this example, the invention is embodied in a search system 54 which searches a database 56 and utilizes the operating system or presentation manager to present the GUI. Some operating systems such as OS/2 have an embedded presentation manager. Other systems use a presentation manager which is a stand alone piece of code. Alternatively, the present invention could be implemented in a stand alone application which has its own graphical user interface.

Query statements which are used to retrieve information from databases are well known to the art. For example, the ANSI standard Structure Query Language (SQL) is one language for composing such statements. A query will define in computer recognizable terms, the tables' in which the data will be found, the tables columns of interest, the conditions rows must satisfy, the order of columns, distinctiveness constraints, connections of data within tables and other relationships. The reader is referred to a text describing SQL and its uses in *IBM Operatina Systems/2 Extended Edition Database Manaaer Structured Query Language* (SQL) concepts booklet published by the IBM Corporation in 1991.

When a link is provided to tie the query statement, its report or results and the query history together, the user can interactively see a query result, manipulate a query result to generate predicates to be added to the next query statement, modify the updated query statement, and see the next query result after the new query statement is modified and executed. Further, a logging facility records the interactive activities a user has performed on the linked query statement, query result, and query history in a problem solving session and presents the query history in the history window. Users are then allowed to use the logging facility to go back to any query statement or result, and then configure this iterative problem solving process. The search system of the present invention provides a more effective way for iterative problem solving than any previous method because a clear record of past activity is actively maintained and is readily available concurrently with the most recent query statement and result. Also, a trial and error problem solving session can be saved and edited to produce plans for future use, which greatly increases the value of this problem solving approach.

As shown in FIGS. 3A–3D, the graphical user interface (GUI) invention is implemented using three windows. The query window 101 contains the most recent query statement in the current query. In this case, SQL is used as the query language, but those skilled in the art would appreciate that other languages could be easily substituted. The graph window 102 shows the results of the query statement displayed in the query window in a graphical representation. In this case, bar charts are used, but the user is free to choose the type of graphical presentation, which could be a line chart, a pie chart, a bar chart, a graph, or other representation. The third window is the history window 103. In the preferred embodiment of the invention, the history of the query is presented as a graphic representation resembling a tree in which all of the query statements and their results are portrayed as nodes.

The windows are all related. Modifying the query statement results in changes in the graph window to reflect the new results for the modified query statement i.e., the query results, similarly, by directly manipulating the graph, the user can modify the query statement as well. For example, selecting a subset of a parameter scaled along the x-axis could result in further restrictions in the SQL WHERE clause. The history window, which is a graphic depiction of a log, records the activity of the user in both the query and graph windows. Each query statement or graphed result is represented as a node in the tree. A graphed result is the child of the query statement that was run to create it. A modified query statement is the child of the query statement from which it was created. Graphically presenting such a progress record allows the user to quickly find previously created query statements, which greatly speeds the process of data analysis.

Many well known graphic user interfaces support a notion of "selecting". To select an object in the GUI, a user puts a mouse pointer over an object on the screen which may be a window on the screen, or in the case of the present invention, a node of a tree, or a bar on a bar graph. The operating system keeps track of the relative position of the objects within the GUI and the mouse pointer as it is manipulated by the user. The user then presses the appropriate mouse button to select the object. The object is then presented with "selected emphasis" by the window manager, which means that the object is visually set apart from other objects, such as inverting the pels around a selected object or changing the color of the border in a selected window. This selection process is commonly referred to as "clicking on" an object.

Figure 3A:
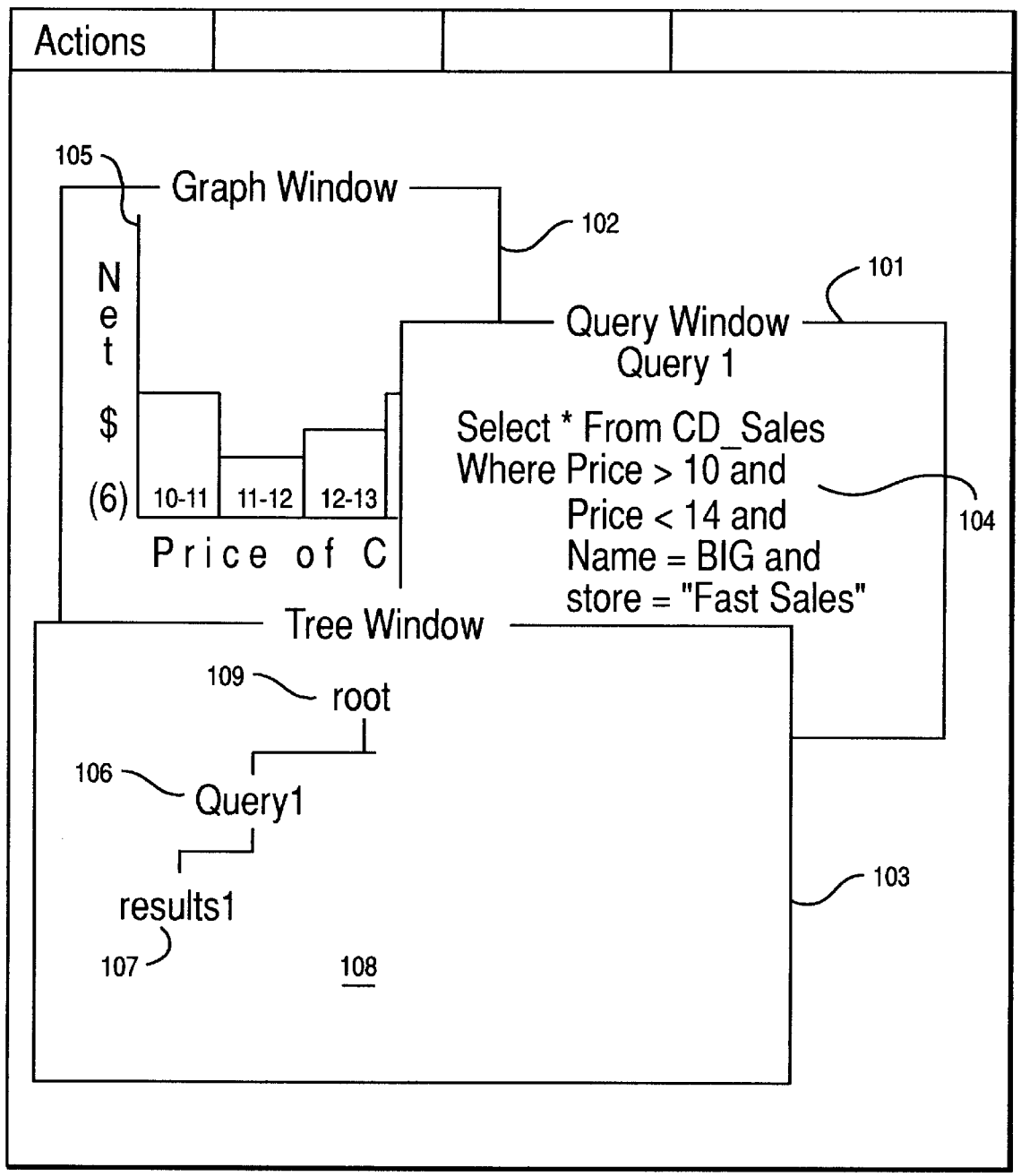
FIGS. 3A–3D depict the graphical user interface of the search system.

FIGS. 3A–3D depict the graphical user interface 100 of the searching system of the present invention as it would be presented on the system display. In this illustrative example, a manager in compact disc (CD) sales for a chain of music stores needs to find the optimal price for a CD. He first, clicks on the query window 101 and is prompted for the name of the query statement. He chooses the system default, Queryl, 104 which includes search statements for price and store location. He fills in the query parameters to find out how many units have sold at a high price (>$20) at a particular store. He runs this query statement and asks for the results 105 in bar graph 105 form by selecting an icon or menu item for a bar graph result or other known selection procedure. The query statement and its graphed results are represented as nodes 106, 107 in the tree 108. Although the figures show the nodes presented as alphanumeric characters, icons or other symbols could be used. He sees in the graph window 102 that the sales at this price and store were poor. He abandons this query. He clicks on the history window 103 and then clicks on the root node 109 of the tree 108 to start over. The GUI at this point in time is shown in FIG. 3A.

Figure 3B:
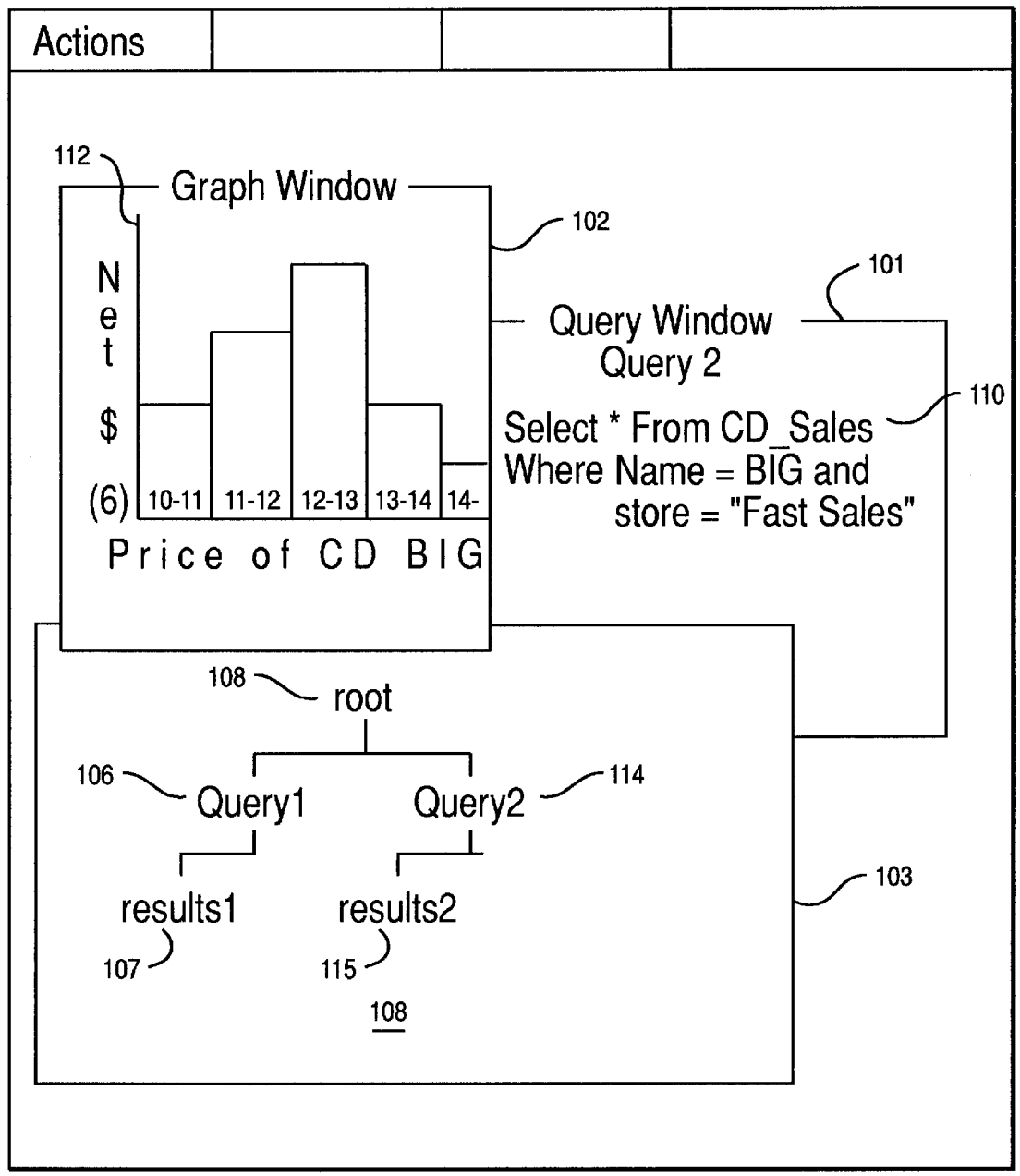
Figure 3C:
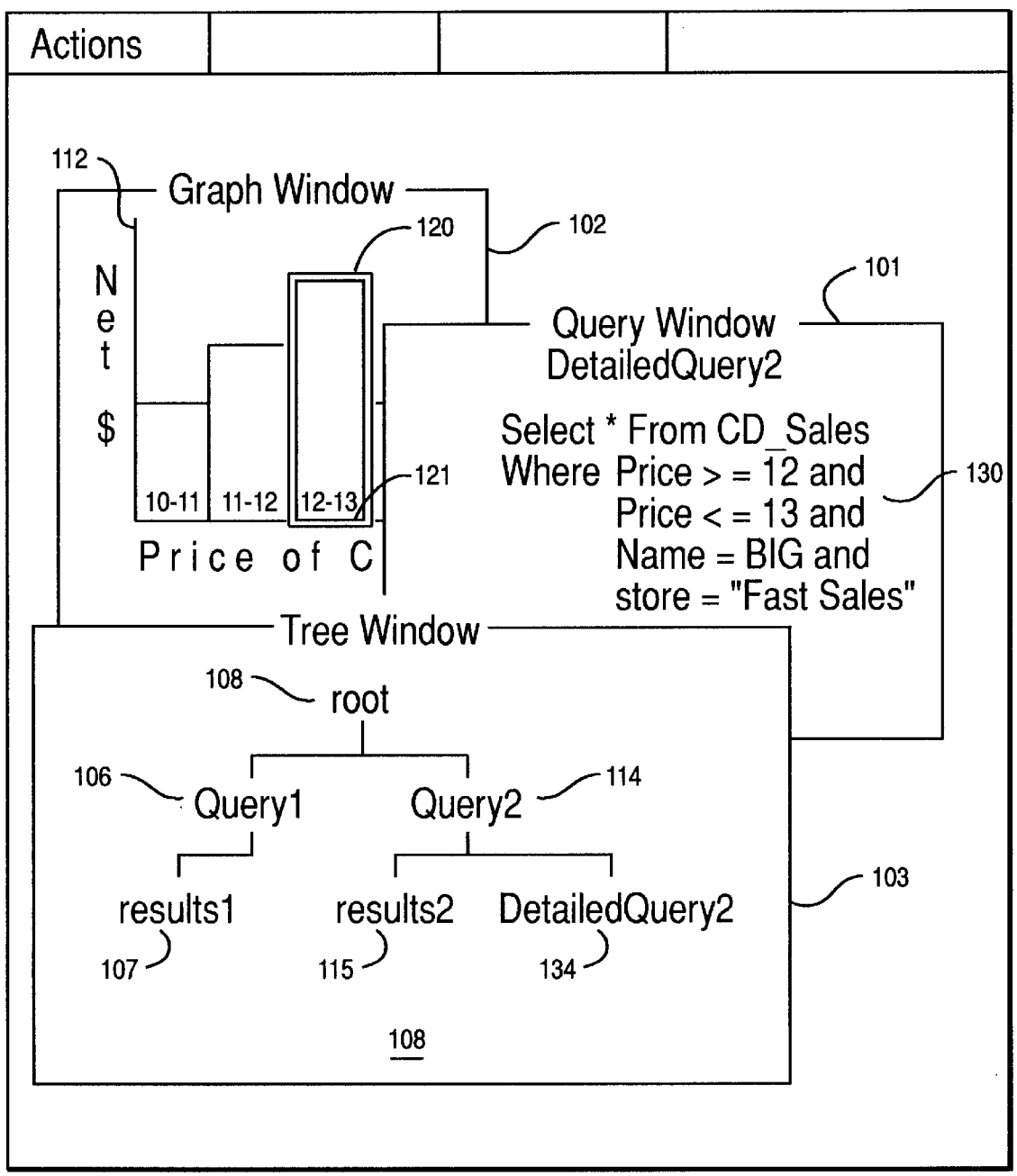

Referring now to FIG. 3B, he types a new query statement 110, Query2, for the total sales at another store with no restriction on price in the query window 101. He runs the query, 110 and, produces a bar graph 112 in the graph window 103. Query2, 110 and its results 112 are shown in the history window 103 as nodes 114, 115 in the tree 118. The GUI 100 at this point is shown in FIG. 3B.

Referring to the bar graph 112, he sees that sales were generally poor, but were good in a small price range. He marks an area 120 on the X-axis 121 which corresponds to the unit price where he sees the peak in sales. In response to the sales manager's manipulation of the graph window 102, referring now to FIG. 3C, the query window 101 is automatically updated. The user is automatically moved back to the query window 101. A pointer 134 to the modified query 130 is stored as a node in the tree 108.

Figure 3D:
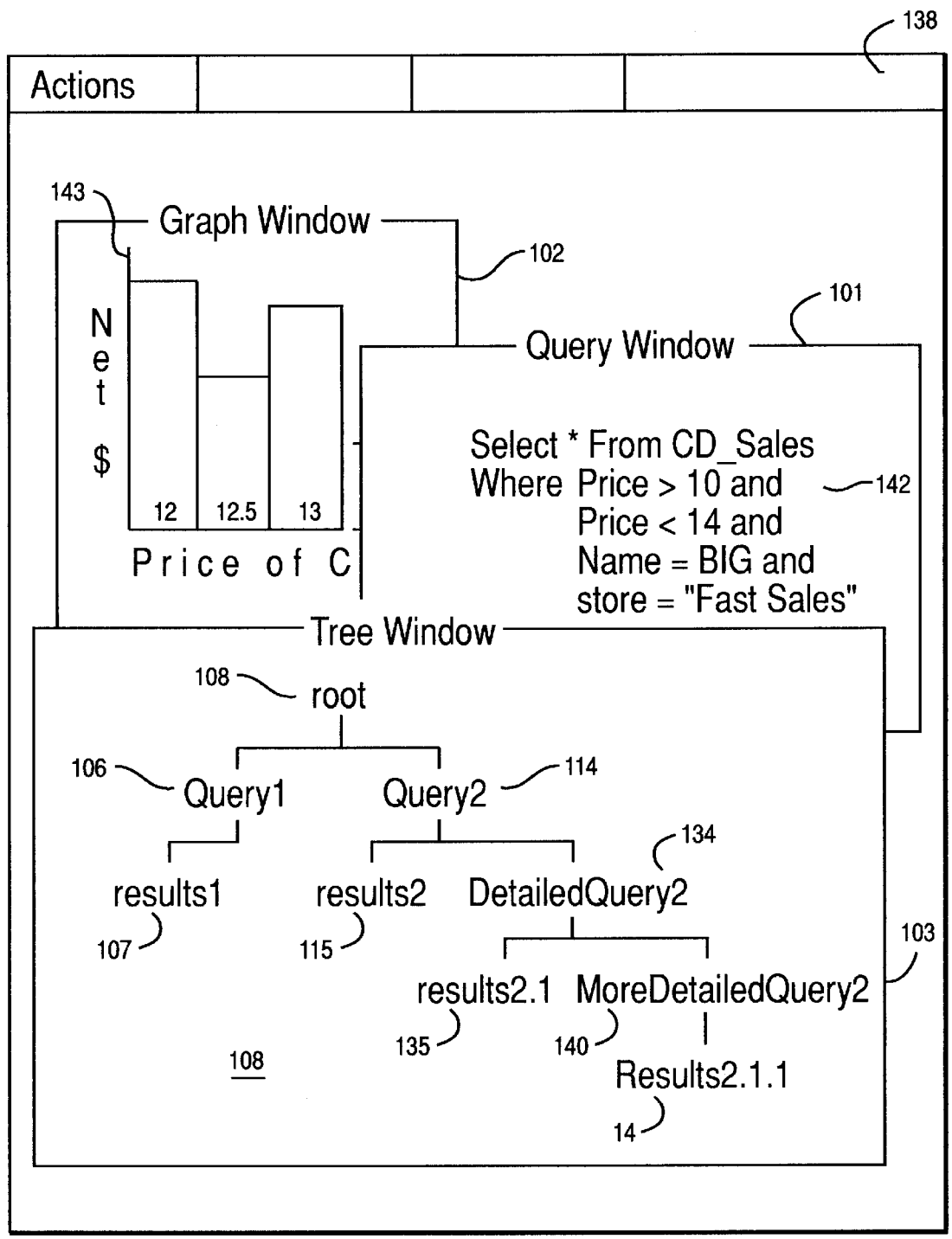

Proceeding to FIG. 3D, the modified query is executed and a new node 135 is added to the tree 108.

The user may continue to work between the query and graph windows 101, 102, to "drill down" to more detailed data, or use the tree 108 to back up to some previous query statement. The record of each of the query statements and results is created and kept in the log and presented in the history window 103. Actions such as the manner in which the query result should be presented can be initiated by selecting a menu item from the action bar 138. Additional nodes 140, 141 represent the most detailed query 142 and its graphed result 143. The results presented in the graph window 102 could be used in a multimedia presentation that fully supports the wide and detailed views of the data.

Figure 4:
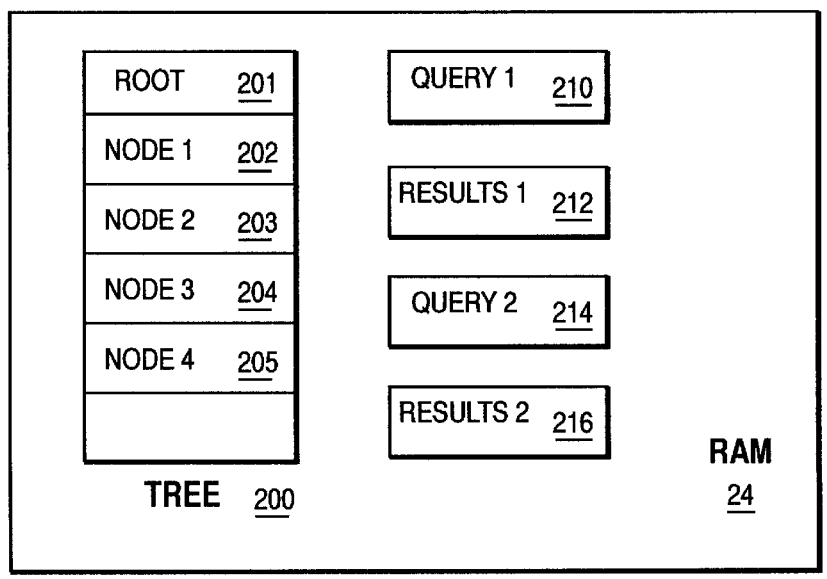
FIG. 4 depicts the data structures used to present the graphical user interface depicted in FIGS. 3A–3D.

Several data structures must be stored in RAM to present the GUI depicted in the preceding figures. As show in FIG. 4, resident in the RAM 24 is a tree data structure 200 which includes root node 201 and several child nodes 202–205. Each of the child nodes 202–205 correspond to one of the query 210, 214 or results 212, 216 objects. More nodes are added to the tree 200 as the user continues his search, creating more query statement and result objects.

The root object 201 is the root of the tree structure and is also a node, which will be used to store the graphs (results) and query statements that the user creates. The NODE objects 202–205 are data structures containing a particular node in the tree. Nodes can correspond to results or query statement. Nodes also contain a list of children, which are also nodes. The node objects include several variables including: NODE_QUERY, a pointer to the query object; it is null if this node is a graph. NODE_GRAPH, which is a pointer to the graph object; it is null if this node is a graph. CHILD_LIST, which contains a pointer to the first of a list that are children of this node. Subsequent children can be found by traversing the NEXT_SIBLING list. NEXT_SIBLING which contains a pointer to the next in a list of siblings. The last sibling in the list will point to NULL. The parent node points to the first child with the variable CHILD_LIST above.

QUERY Objects 210, 214 are data structures containing all the elements that make up a query statement. The QUERY_NAME variable contains the name of the query statement. QUERY_BUFFER variable contains all of the text or data that make up the internal representation of the query. The HAS_BEEN_RUN variable is a boolian flag that is set to true if the query has been run.

The result objects 212, 216 are data structures containing all elements that make up a result and its graphical representation. The GRAPH_TYPE variable is the type of graph, e.g., bar, line, pie, etc.). The GRAPH_BUFFER variable contains all of the text and data that make up the internal representation of the graph. The PARENT_NODE is the query that was run to create this graph. If this graph is modified, then the resulting query will be stored as a child of this node.

Several other variables are used to keep track of the user's progress in the search. THIS_QUERY: QUERY variable is used to contain the name of the query with which the user is working. THIS_GRAPH: GRAPH variable is used to contain the most recently stored result. The CURRENT_NODE: NODE variable is used to keep track of the user's position in the tree.

Figure 5A:
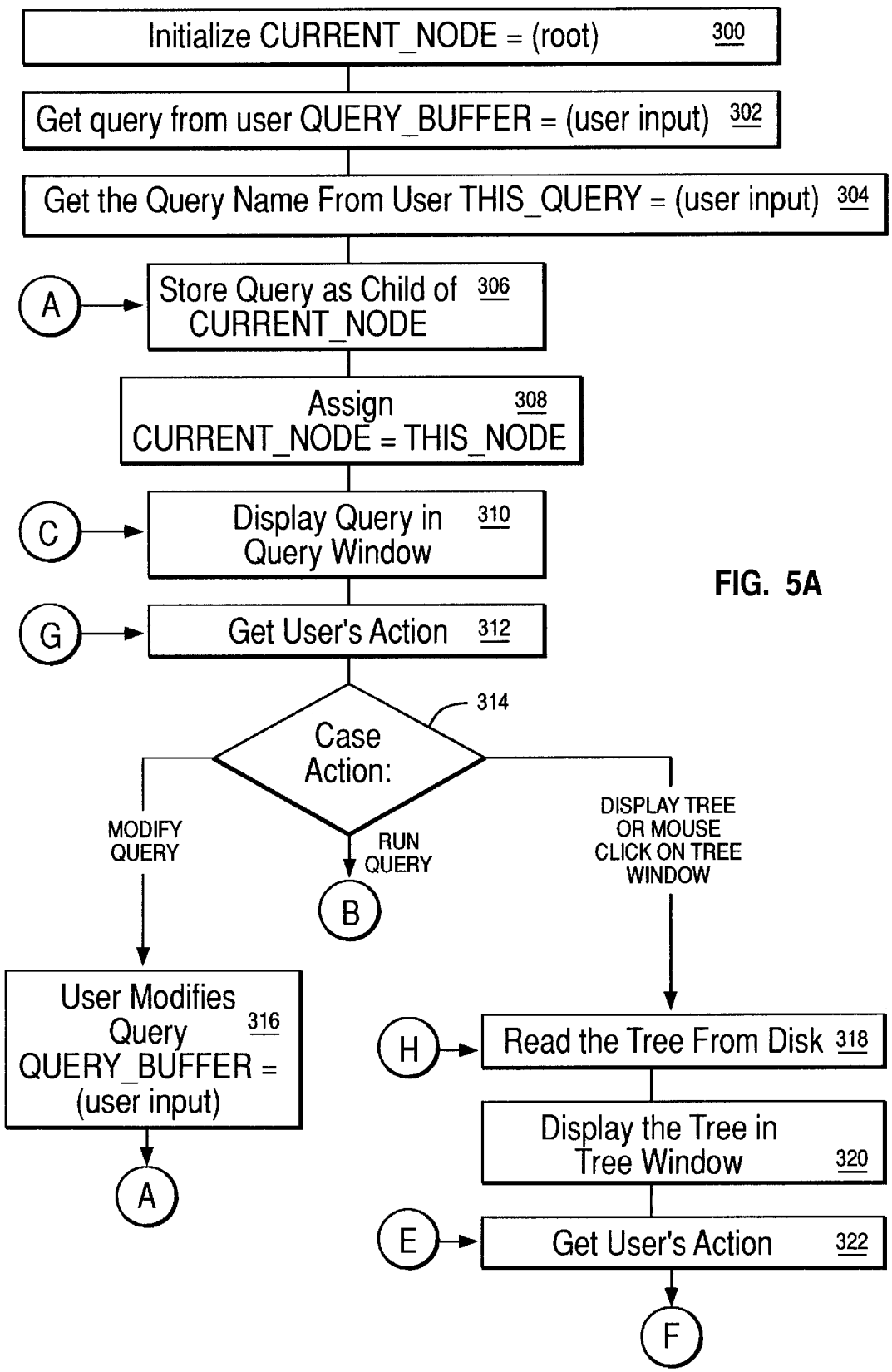
FIG. 5A–5C are flow diagrams of the search process as the user manipulates the graphical user interface depicted in FIGS. 3A–3D.
Figure 5B:
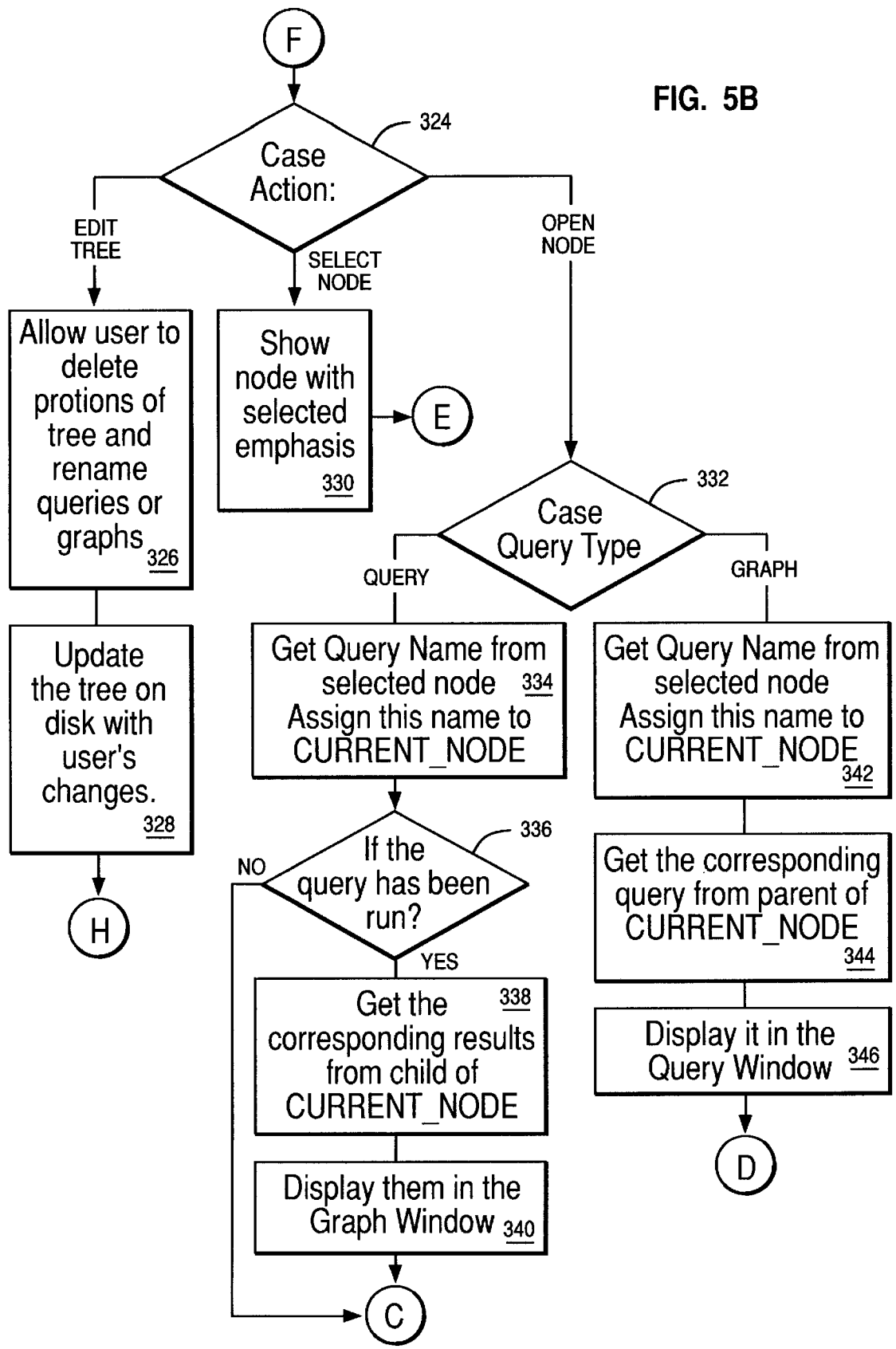
Figure 5C:
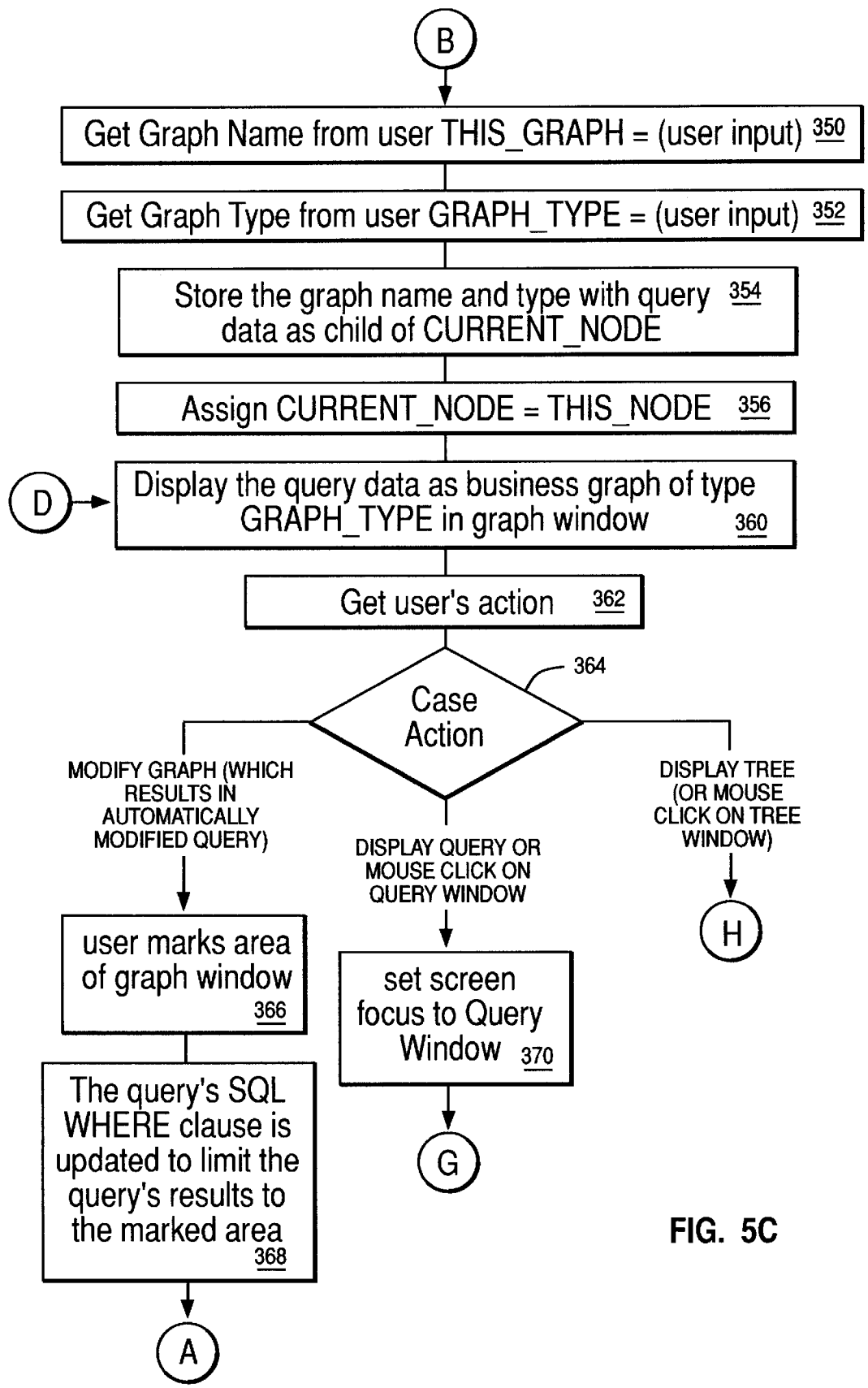

A process flow as the user manipulates the search system is illustrated in FIGS. 5A–5C. In step 300, the three windows are initialized and the current node is set to the root node in the tree structure. Next, the system waits for the first query statement from the user. When it receives the query statement in step 302, it creates the first query object and sets the query statement in the QUERY_BUFFER variable. Next, in step 304, the user is given the option of naming the query statement. The query name chosen is entered in the QUERY_NAME variable. Alternatively, a system default naming mechanism may be used to name the query object. Next, in step 306, the query object is stored as a child of the current node, which in this case is the root node. Next, in step 308, the CURRENT_NODE variable is set to THIS_NODE variable which is the current query statement. Next, in step 310, the query statement is displayed in the query window.

At this point, the computer waits for the next user input. In step 312, the computer receives this input, and in step 314, it categorizes the input. One of the possibilities is that the user modifies the first query statement to write a second query statement which will require creation of its own query object. In step 316, the QUERY_BUFFER variable of the second query object is set to the new query statement written by the user. The process returns to step 306 where the new query statement is stored as a child of the current node which is the first query statement. A second alternative is to run the query which is shown in FIG. 5C. If the user action in steps 312 and 314 is a request to display the tree via a mouse click on the history window, the process proceeds to step 318 where the search history is retrieved from storage. In step 320, the tree, which is the graphical representation of the search history, is displayed in the history window.

At this point, the search system waits for the next user input. In step 322, it receives the input. Proceeding to FIG. 5B, the system determines the type of input the user made, step 324. If the user has requested to edit the tree, in step 326, the user may delete branches of the tree or rename nodes and queries or graphed results. After a successful search has been done, it is important for others to understand the process that produced the desired results. The log can be used for that purpose. The tree can be pruned to more easily input the successful search. For example, nodes in which typographical errors were made should be deleted to clean up the log, so that it can be easily understood by others. To delete a node, the user clicks on the node. The node is marked. The user then specifies a delete instruction from an action bar menu, or from some other means. This node, and all of its children are deleted. This is accomplished by removing the selected node from the selected node's immediate parent. It may also be beneficial to rename query, graph, or result nodes with names that are more descriptive. This can be accomplished in a similar, manner. By clicking on a node, the node is marked. The user can then specify a rename instruction from a menu item of an action bar or some other means. The user is then free to type in a new text string followed by the enter key. This text string will become the new name for the node. Once all the changes have been input, the tree is updated in disk storage with the user changes and the process returns to step 318.

If the user's action is to select a node in a tree, in step 330, the node is shown with a selective emphasis. The process returns to step 322 to wait for new user input. If the user action is to open a node, in step 332, the system determines whether the node type is a query node or a result (graph) node. If the node is a query node in step 334, the query name is retrieved from the selected node and this name is assigned to the CURRENT_NODE variable. Next, in step 336, a test is performed to determine whether the query statement has been run before. If so, in step 338, the results from the query statement are retrieved. The results, as discussed above, are in a child node of the query statement or current node. These results are displayed in a graph window in step 340. If the query has not been run or once the results have been displayed in a graph window, the process returns to step 310 in which the query is displayed in the query window.

If the opened node in the tree is a result node, the result name is retrieved and assigned and the CURRENT_NODE variable is signed to this name, in step 342. In step 344, the corresponding query statement, the parent node of the current result node is retrieved from the parent of the CURRENT_NODE variable. In step 346, the query statement is displayed in the query window. At this point, the process proceeds to step 360 in FIG. 5C.

If the user input in step 314 of FIG. 5A is to run the query, the process as depicted in FIG. 5C is performed. First, in step 350, a name of the result node is retrieved from user input and assigned to the THIS_GRAPH variable. Alternatively, a default mechanism may be used to assign the result node name. In step 352, the type of a graphical representation of the desired by the user input and the GRAPH_TYPE variable is assigned to the user input. The graph name and type are stored within an object which is the child of the current node object in step 354. Next, in step 356, the CURRENT_NODE variable is assigned to the node of the THIS_NODE variable which is the result node. In step 360, the results of the query statement are displayed in the graphical representation chosen by the user in the graph window.

There are many existing methods of graphing the results which satisfy the conditions of the query statement. For example, commercially available spreadsheets take results and graph them in a bar, line, or pie chart, using a legend and a value. First, the system looks at all of the columns in the spreadsheet and uses the first text field as a legend and the first numeric field is used as the value for this text field. If these fields are not appropriate, the application provides the user with a window to type in new legends or choose a new column to override these defaults.

Next, the computer system waits for the next user action. In step 362, the next user action is received and is evaluated in step 364. The user input may be a request to modify the graph which will result in a modified query statement. In step 366, the user marks an area of the graph window and in step 368, the query statement is updated as a result of the marked area. The resulting new query is stored as a child of the current node in step 306 of FIG. 5A.

The selection of and marking a portion of the graphical representation of the results in the graph window can be accomplished in a number of different ways depending in the nature of the graphical representation.

If the graphical presentation of results is presented linearly with respect to one of the search parameters, the query statement with respect to that search parameter can be altered according to the teachings of copending, commonly assigned patent application entitled "Graphical Definition of Range in the Selection of Data From a Database Field" to S. G. Li et al, Ser. No. 07/983,095, filed Nov. 24 1992 and hereby incorporated by reference. For example, positions along the axis which represents the search parameter in a bar graph are defined by a plurality of tacks. Each tack position corresponds to a value for the search parameter. By marking a field between two tack positions, the user can modify an SQL between statement to correspond to the values which fall between the corresponding search parameter values.

For a pie chart or a bar chart, each piece of pie or each bar displays information belonging to a certain category or range of search parameters. By selecting, i.e, marking, one or more pie pieces or bars, the query statement could be altered to search for data which satisfy the selected categories or ranges. If the results are presented in a line or scatter chart in two or three dimensions, a rectangle or cube may be drawn around regions of interest. Each of the edges of the rectangle or cube would correspond to the upper or lower value in a range of values of search parameters graphed along a particular axis. The SQL between clause for a plurality of query parameters can be modified to correspond to the selection range of values as in the above referenced application. Since at least one of the graphed parameters must be a result rather than a search parameter, the selection by means of a box or cube can also mean not to present results which occur outside the selected range.

Modifying the query statement to produce a new query statement according to manipulation of the graphed results of the query statement is taught in greater detail in commonly assigned, copending application Ser. No. 08/072,618 and now U.S. Pat No. 5,608,899 entitled "Method and Apparatus for searching a Database" filed on the same date as the present application which is hereby incorporated by reference.

Alternatively, the user input in steps 362 and 364 may be to display the query statement or a mouse click on a query window. In step 370, the screen focus is set to the query window. Alternatively, the user may wish to display the tree in the tree window, in which case, the process returns to step 318 in FIG. 5A.

If there are too many nodes to be presented within the display space allotted to the history window, the user may scroll back to prior nodes via scroll bars attached to the edges of the windows. An alternative embodiment of the invention, could display the query statement and its result with a single symbol to save display space. If the symbol is selected, an exploded version of the symbol is presented in which both the query statement and result are visible and selectable. While the operating system can theoretically handle infinitely large presentations through the use of the scroll bars, with a large tree and a small history window, the search system will be less effective in summarizing the query history. However, it will still be better than the prior art systems.

One alternative embodiment would allow the user to scroll the query or graph windows to concurrently show the associated query statements and results. This provides an excellent means to gain a more detailed understanding of the summary of the query as presented within the tree. As the query statement and its results are linked together as parent and child objects, input to the scroll bars could be another entry to the process described above in connection with FIGS. 5A–5C.

As the scrolling or other manipulations takes place, the current node in the tree could be emphasized each time the presentation in the history window is refreshed.

As mentioned above, the search system is not limited to the SQL query. There are several query languages that would work well within the framework of this invention. IBM's Query By Example (QBE) is one example of another query language which would work well within this context. Further, the graphical representation is not limited to a business graph. In fact, it is easy to store pictorial data in a relational database. Many relational database managers store pictorial information into a file. Within the relational database table which contains a reference to the pictorial information, a pointer or offset into the file is stored within the relational database. This method can also be used to store additional types of multimedia data, such as sound information, e.g., the relational database table can contain the title and track number on an ordinary music compact disk.

Figure 6:
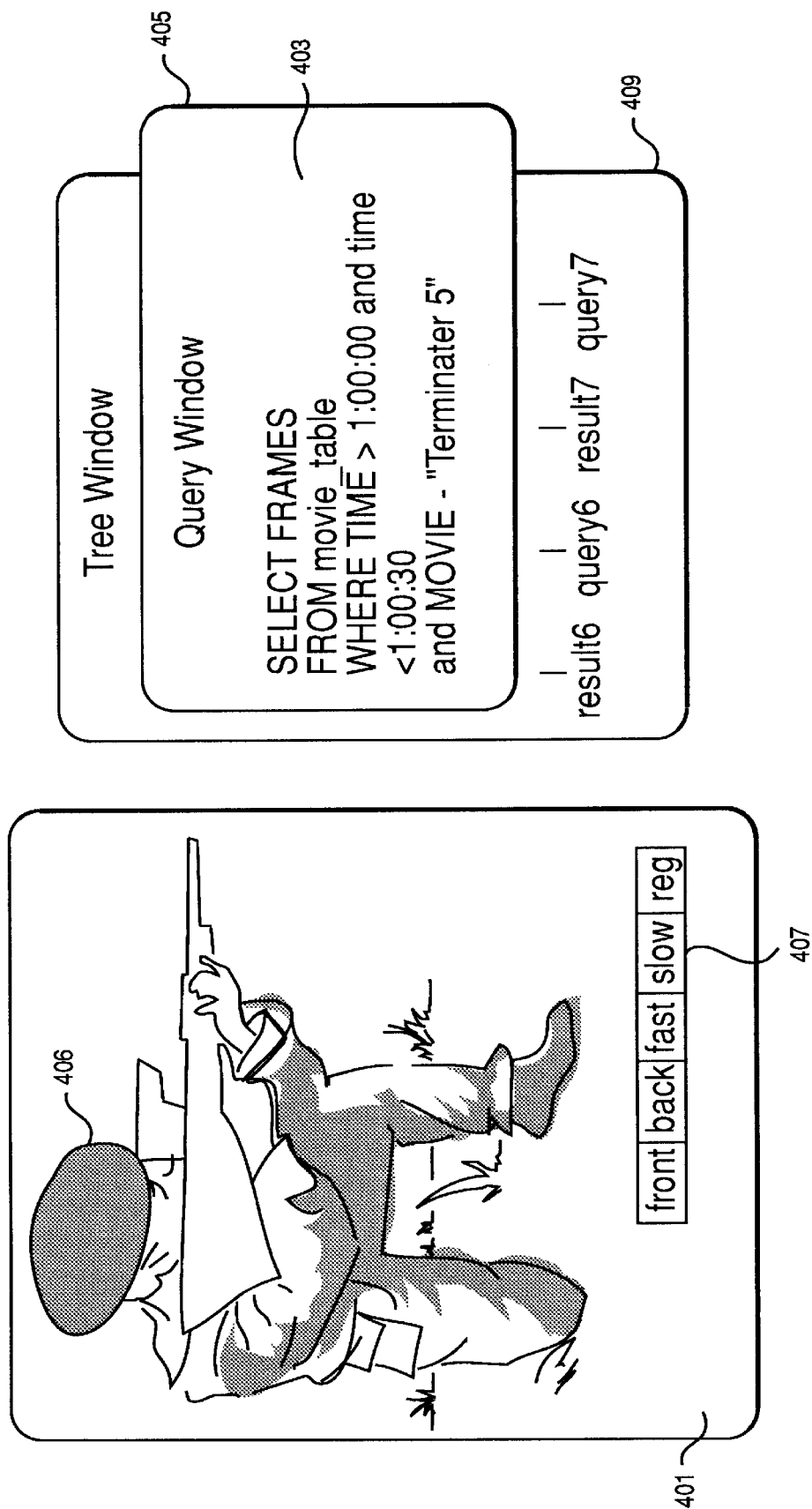
FIG. 6 is the graphical user interface of the search system wherein the graph window presents a multimedia data stream.

As depicted in FIG. 6, a film archival system which when searched will display results in full motion video is an ideal application. Using the query statement to select a list of frames and the graph window 401 to present the results, this solution can effectively be used to find clips within a database of video. One relational database table could contain records which each have 1) a movie or selection name, 2) the name of the file that contains the movie, 3) a frame identifier that contains the offset within the file of the frame in question, 4) a time stamp for synchronization purposes (the frame is displayed at this time stamp). The query statement 403 in the query window 405≧ could read: SELECT FRAMES, FROMmovie_table, WHERE TIME>1:00:00 and time<1:00:30 and MOVIE-"Terminator 5", ORDERBYTIME; This query statement 403 would display the 30 seconds of video 406 within the graph window 401, which satisfy the query statement. To make scrolling through the frames effective, rewind, fast forward, play, and single step buttons 407 could be presented and used in the usual way. The history window 409, as before, would provide a convenient means of understanding the previously viewed film clips and the query statements used to display them.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method of searching a database stored on a computer system having a display, comprising the steps of:

concurrently displaying, in respective first, second and third windows of the display:
a first query statement;
a first set of results from a database search of the first query statement;
a symbolic representation of one or more query statements entered during a current query session involving multiple queries including the first query statement; and linking the respective first, second and third windows such that alteration of given information in one of the windows alters the display of information in at least one of the other windows, wherein the linking step includes the steps of
marking a section of the first set of results in response to user input;
creating a second query statement according to the first query statement and the marked section;
displaying a second set of results from a database search of the second query statement; and modifying the symbolic representation to include a representation of the second query statement.

2. The method as recited in claim 1 wherein the symbolic representation is a tree structure including one or more nodes, the first query statement displayed as a parent node in the tree structure and the first set of results displayed as a child node of the parent node.

3. The method as recited in claim 2 wherein the linking step comprises the steps of:

selecting a node in the tree structure in response to user input;

presenting a second query statement represented by the selected node; and displaying a set of results from searching the second query statement represented by the selected node.

4. The method as recited in claim 3 wherein the linking step further comprises the steps of:

modifying the second query statement in response to user input to create a third query statement;

displaying the third query statement;

displaying a third set of results from a database search of the third query statement; and modifying the tree structure to include a node corresponding to the third query statement and to include a node corresponding to the third set of results.

5. The method as recited in claim 2 wherein the linking step comprises the step of:

deleting at least one node in the tree structure representing an unsuccessful query statement.

6. The method as recited in claim 1 wherein the symbolic representation includes a first symbol representative of both the first query statement and the first set of results and the linking steps includes the steps of:

selecting the first symbol; and displaying an exploded version of the first symbol in which both the first query statement and the first set of results are separately displayed and selectable.

7. A computer program product in a computer readable memory for controlling a processor to search a database stored on a computer system, the product comprising:

means for concurrently displaying, in respective first, second and third windows of a display of the computer system:

a first query statement;

a first set of results from a database search of the first query statement; and a symbolic representation of one or more query statements entered during a current query session involving multiple queries including the first query statement; and;

means for linking the respective first, second and third windows such that alteration of given information in one of the windows alters the display of information in at least one of the other windows, wherein the means for linking comprises:

means for marking a section of the first set of results in response to user input;

means for creating a second query statement according to the first query statement and the marked section;

means for displaying a second set of results from a database search of the second query statement; and means for modifying the symbolic representation to include a representation of the second query statement.

8. The product as recited in claim 7 wherein the symbolic representation is a tree structure including one or more nodes, the first query statement displayed as a parent node in tree structure and the first set of results displayed as a child node of the parent node.

9. The product as recited in claim 8 wherein the linking means comprises:

means for selecting a node in the tree structure in response to user input;

means for presenting a second query statement represented by the selected node; and means displaying a set of results from searching the second query statement represented by the selected.

10. The product as recited in claim 9 wherein the linking means further comprises:

means for modifying the second query statement in response to user input to create a third query statement;

means for displaying the third query statement;

means displaying a third set of results from a database search of the third query statement; and means for modifying the tree structure to include a node corresponding to the third query statement and to include a node corresponding to the third set of results.

11. The product as recited in claim 8 wherein the linking means comprises:

means for deleting a node in the tree structure representing an unsuccessful query statement; and means for automatically deleting any child nodes of the deleted node.

12. The product as recited in claim 7 wherein the first and second windows are concurrently scrolled to respectively display query statements and corresponding sets of results summarized in reports.

13. A system including processor, memory, display and input device for searching a computer stored database, comprising:

means for concurrently displaying, in respective first, second and third windows of a display of the computer system:

a first query statement;

first set of results from a database search of the first query statement; and a symbolic representation of one or more query statements entered during a current query session involving multiple queries including the first query statement; and;

means for linking the respective first, second and third windows such that alteration of given information in one of the windows alters the display of information in at least one of the other windows, wherein the means for linking comprises:

means for marking a section of the first set of results in response to user input;

means for creating a second query statement according to the first query statement and the marked section;

means for displaying a second set of results from a database search of the second query statement; and means for modifying the symbolic representation to include a representation of the second query statement and a representation of the second set of results.

14. The system as recited in claim 13 wherein the symbolic representation is a tree structure including one or more nodes, the first query statement displayed as a parent node in the tree structure and the first set of results displayed as a child node of the parent node.

15. The system as recited in claim 14 wherein the linking means comprises:

means for selecting a node in the tree structure in response to user input;

means for presenting a second query statement represented by the selected node; and means for displaying a set of results from searching the second query statement represented by the selected node.

16. The system as recited in claim 15 wherein the linking means further comprises:

means for modifying the second query statement in response to user input to create a third query statement;

means for displaying the third query statement;

means for searching the database according to the third query statement and displaying a third set of results from a database search of the third query statement; and means for modifying the tree structure to include a node corresponding to the third query statement and to include a node corresponding to the third set of results.

17. The system as recited in claim 14 wherein the linking means comprises:

means for changing a symbol in the tree structure representing a node to be more descriptive of the node.

18. The system as recited in claim 13 wherein scroll bars are provided to display query statements outside a current display space in the third window.

19. A method of editing a database of stored video data stored on a computer system having a display, comprising the steps of:

opening on the display a query window, a history window and a video window;

searching for a first segment of video data in response to the user input of a first query statement, the first query statement displayed in the query window;

displaying a symbolic representation including a first symbol representative of the first query statement in the history window;

displaying the first segment in the video window; and linking the respective query, history and video windows such that alteration of given information in one of the windows alters the display of information in at least one of the other windows, wherein the linking step includes the steps of;

taking a given action in response to user input in the video window;

creating a second query statement according to the first query statement and the given action;

displaying a second video segment from a database search of the second query statement; and modifying the symbolic representation to include a representation of the second query statement.

20. A video data editing system including processor, memory, display and input device, comprising:

means for opening on the display a query window, a history window and a video window;

means for searching for a first segment of video data in response to the user input of a first query statement, the first query statement displayed in the query window;

means for displaying a symbolic representation including a first symbol representative of the first query statement in the history window;

means for displaying the first segment in the video window; and means for linking the respective query, history and video windows such that alteration of given information in one of the windows alters the display of information in at least one of the other windows, wherein the means for linking step comprises:

means responsive to user input causing a given action in the video window for creating a second query statement according to the first query statement and the given action;

means for displaying a second video segment from a database search of the second query statement; and means for modifying the symbolic representation to include a representation of the second query statement.

21. A computer program product on a computer readable memory executable by a computer system for editing stored video data, comprising:

means for opening on the display a query window, a history window and a video window;

means for searching for a first segment of video data in a computer memory in response to the user input of a first query statement, the first query statement displayed in the query window;

means for displaying a symbolic representation including a first symbol representative of the first query statement in the history window;

means for displaying the first segment in the video window on the display; and means for linking the respective query, history and video windows such that alteration of given information in one of the windows alters the display of information in at least one of the other windows, wherein the means for linking step comprises:

means responsive to user input causing a given action in the video window for creating a second query statement according to the first query statement and the given action;

means for displaying a second video segment from a database search of the second query statement; and means for modifying the symbolic representation to include a representation of the second query statement.

* * * * *

UNITED STATES PATENT AND TRADEMARK OFFICE
CERTIFICATE OF CORRECTION

PATENT NO : 5,911,138
DATED : Jun. 8, 1999
INVENTOR(S) : Li et al.

It is certified that error appears in the above-identified patent and that said Letters Patent is hereby corrected as shown below:

In Claim 8, Line 4, after "in" insert --the--
In Claim 9, Line 13, after "selected" insert --node--
In Claim 13, Line 42, insert --a-- before "first"

Signed and Sealed this

Thirtieth Day of January, 2001

Attest:

Q. TODD DICKINSON

Attesting Officer        Director of Patents and Trademarks